United States Patent
Albero et al.

(10) Patent No.: US 11,616,794 B2
(45) Date of Patent: Mar. 28, 2023

(54) DATA MANAGEMENT SYSTEM

(71) Applicant: Bank of America Corporation, Charlotte, NC (US)

(72) Inventors: George Albero, Charlotte, NC (US); Edward L. Traywick, Charlotte, NC (US); Elijah Clark, Charlotte, NC (US); Caleb G. Mann, Charlotte, NC (US); Michael Beveridge, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 411 days.

(21) Appl. No.: 16/425,058

(22) Filed: May 29, 2019

(65) Prior Publication Data

US 2020/0382531 A1    Dec. 3, 2020

(51) Int. Cl.
*H04L 9/40*    (2022.01)
*G06N 3/08*    (2023.01)

(52) U.S. Cl.
CPC ........... *H04L 63/1425* (2013.01); *G06N 3/08* (2013.01)

(58) Field of Classification Search
CPC .............................. H04L 63/1425; G06N 3/08
USPC .......................................................... 726/23
See application file for complete search history.

(56) References Cited

U.S. PATENT DOCUMENTS

| | | | |
|---|---|---|---|
| 8,793,790 B2 | 7/2014 | Khurana et al. | |
| 8,868,728 B2 | 10/2014 | Margolies et al. | |
| 9,038,187 B2 | 5/2015 | McHugh et al. | |
| 9,043,905 B1 | 5/2015 | Allen et al. | |
| 9,141,790 B2 | 9/2015 | Roundy et al. | |
| 9,166,997 B1 | 10/2015 | Guo et al. | |
| 9,256,739 B1 | 2/2016 | Roundy et al. | |
| 9,589,245 B2 | 3/2017 | Coden et al. | |
| 9,641,544 B1 | 5/2017 | Treat et al. | |
| 9,680,855 B2 * | 6/2017 | Schultz | G06Q 10/0635 |
| 9,727,821 B2 | 8/2017 | Lin et al. | |
| 10,003,608 B2 * | 6/2018 | Treat | H04L 63/0227 |
| 10,015,175 B2 | 7/2018 | Kent et al. | |
| 10,762,200 B1 * | 9/2020 | Salem | G06F 21/564 |
| 10,810,501 B1 * | 10/2020 | Kimchi | B64C 39/024 |
| 2015/0381649 A1 * | 12/2015 | Schultz | H04L 63/1433 726/25 |
| 2016/0028830 A1 * | 1/2016 | Coglitore | H04L 67/2842 709/213 |
| 2017/0264628 A1 * | 9/2017 | Treat | H04L 63/0227 |
| 2017/0330117 A1 | 11/2017 | Dean et al. | |
| 2018/0032801 A1 * | 2/2018 | Gur | G06K 9/6256 |
| 2018/0293400 A1 * | 10/2018 | Borup | H04L 67/06 |
| 2019/0286945 A1 * | 9/2019 | Kamath | G06V 10/82 |

* cited by examiner

*Primary Examiner* — Teshome Hailu
(74) *Attorney, Agent, or Firm* — Banner & Witcoff, Ltd.

(57) ABSTRACT

Methods, systems, and computing platforms for data communication are disclosed. Exemplary implementations may: electronically process with a machine learning controller; electronically process the data payloads in the network with deep machine learning; and real-time adjusting of a plurality of network infosec controls associated with the originating node attribute based on the infosec control attribute.

16 Claims, 6 Drawing Sheets

DATA MANAGEMENT SYSTEM

FIELD OF THE DISCLOSURE

The present disclosure relates to methods, systems, and computing platforms for data communication with machine learning.

BACKGROUND

Moore's law predicted that the number of transistors on a computer chip would double every two years while the chip's price would remain constant. "Moore's law" meant consumers could buy the better technology two years later for about the same price. Fifty years later, Moore's law prediction has endured to the idea that technology companies have recognized Moore's law as a benchmark they must meet, or fall behind in the market. Patrons have come to expect technological products to be faster, cheaper, and more compact over time. This expectation seems to have driven trends of rapid growth in computing power, smaller devices, the ability to connect to the Internet, and reduction in cost and big data.

The risk of insider threats compared to outsider threats is an ongoing debate, though more companies are taking notice of the risks that insiders can pose to the company's data security today than in the past. Historically, the data breaches that make the news are typically carried out by outsiders. While these breaches can cost hundreds of thousands of dollars (often millions more), outsider threats are generally the threats that have been addressed with traditional security measures. The threats that originate from inside that are much more difficult to prevent and detect using one-size-fits-all security measures. One of the reasons that insider threats are more difficult to prevent stems from the fact that insiders don't always threaten the company's data security intentionally. There is a need to improve the technological processing in the new computing era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One aspect of the present disclosure relates to a system and method configured for data communication. The system may include one or more hardware processors configured by machine-readable instructions. One aspect of the present disclosure relates to a method for data communication. Via a computer-data communication based network, the method includes receiving a set of virtual nodes each with a data payload that may include an originating node attribute, an infosec data attribute, an behavioral data attribute, a biometric enterprise attribute and/or at least one data element associated with the originating node attribute. The method may include electronically processing with a machine learning controller. The data payloads may include the originating node attribute, infosec data attribute and the biometric enterprise attribute and the at least one data element associated with the originating node attribute to create an infosec control attribute. The method may include electronically processing the data payloads in the network with machine learning. The method may include real-time adjusting of a plurality of network infosec controls associated with the originating node attribute based on the infosec control attribute.

In some implementations of the method, may include electronically processing with the machine learning controller various data elements. In some implementations of the method, the data payload may include a network anomaly attribute.

In some implementations of the method, the at least one data element associated with the originating node attribute may include an electronic messaging control element. In yet some implementations of the method, the at least one data element associated with the originating node attribute may include a log data attribute.

In some implementations of the method, the at least one data element associated with the originating node attribute may include a GPS location attribute.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of a, an, and the include plural referents unless the context clearly dictates otherwise.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
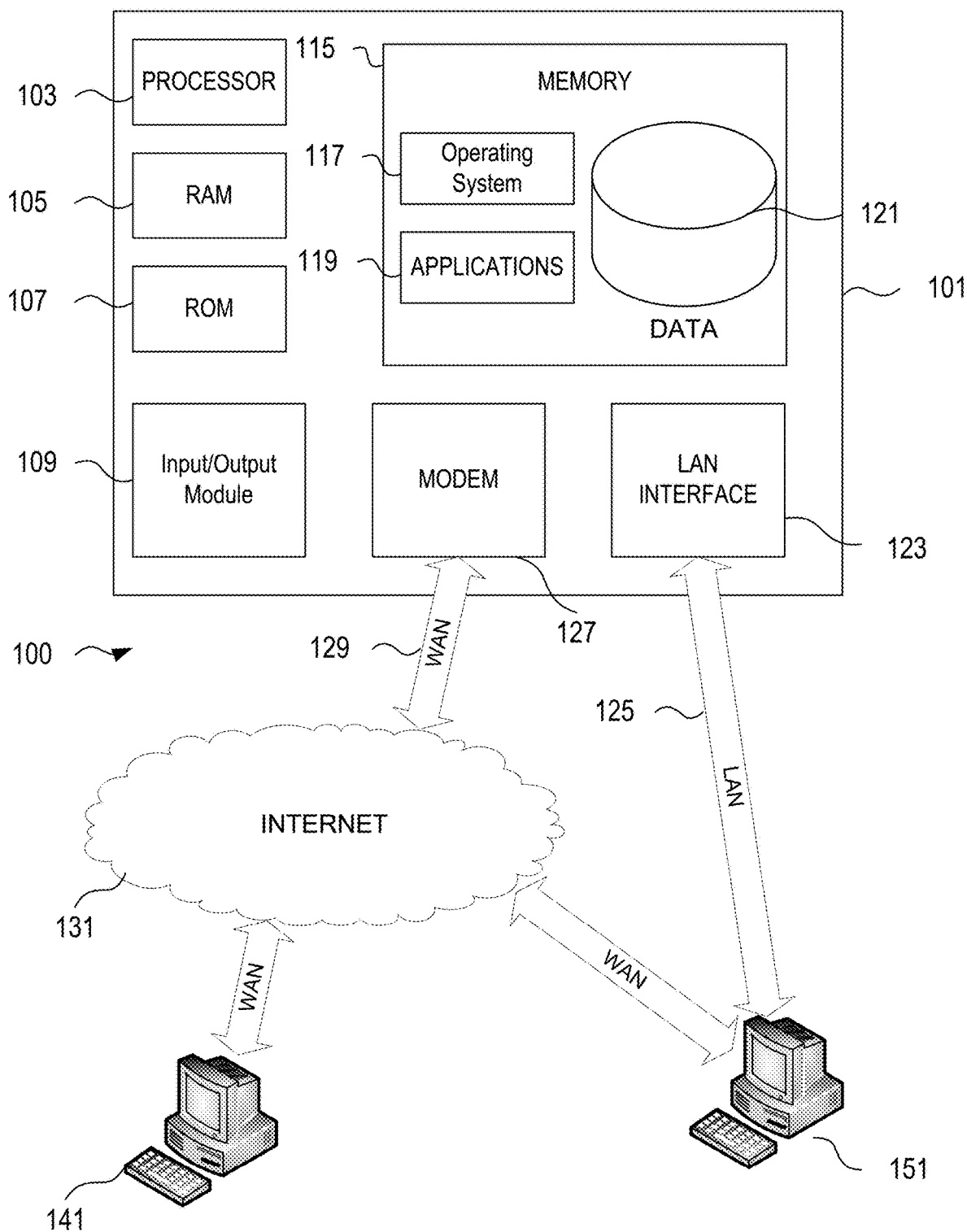
FIG. 1 illustrates a schematic diagram of a digital computing environment in which certain aspects of the present disclosure may be implemented.

FIG. 1 illustrates a block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
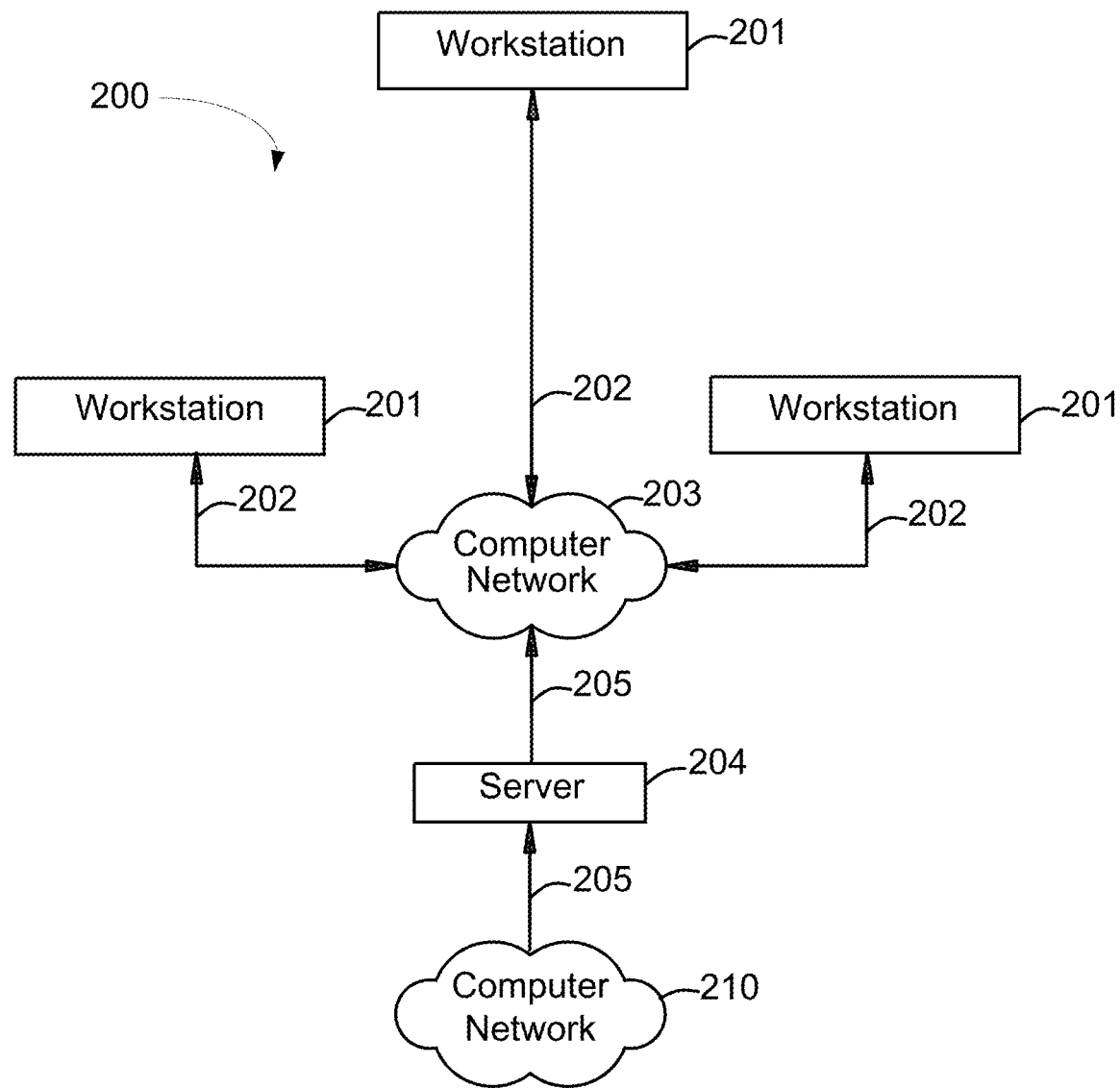
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3:
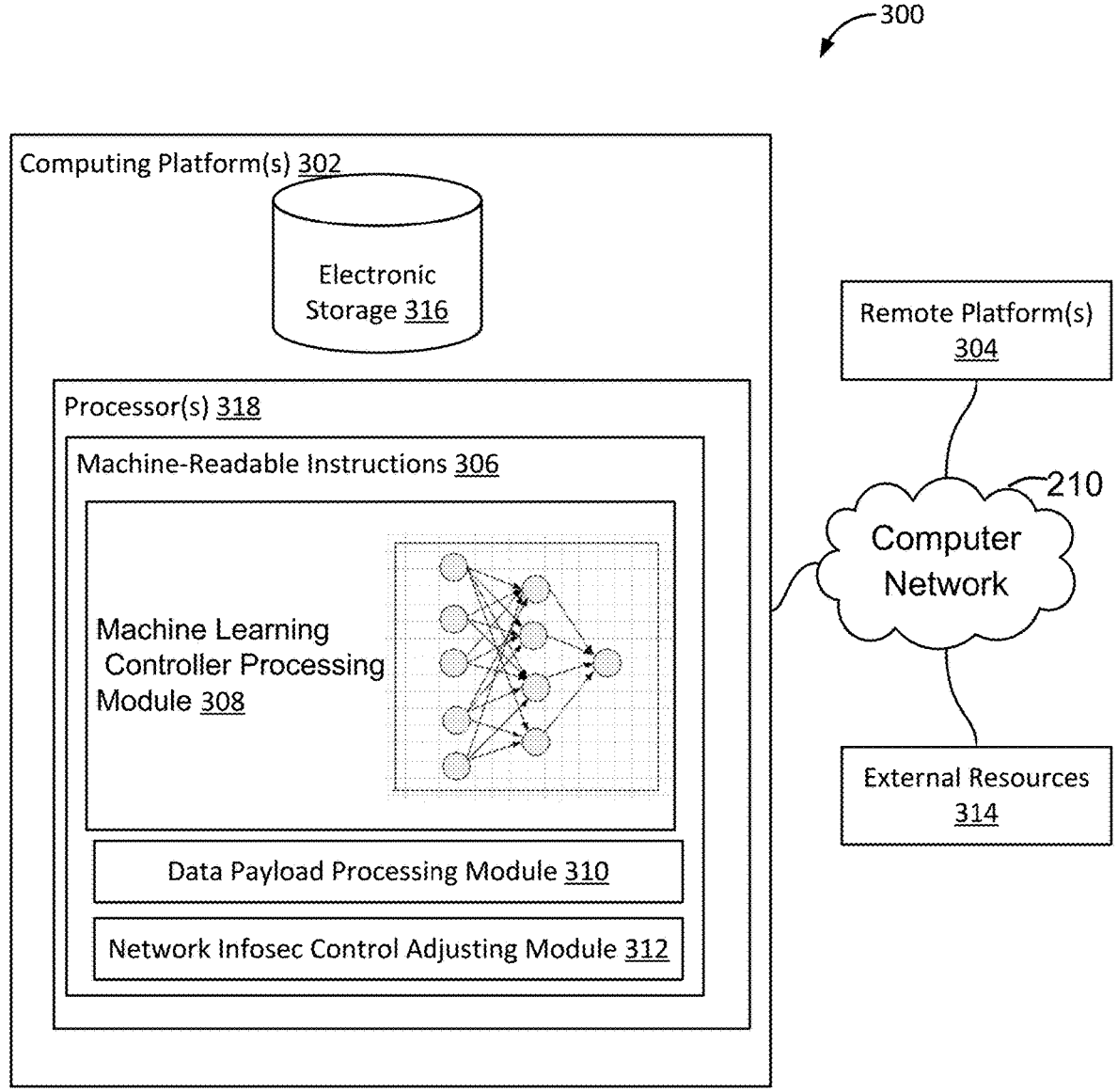
FIG. 3 illustrates a system configured for data communication, in accordance with one or more implementations.

FIG. 3 illustrates a system 300 configured for data communication, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of machine learning controller processing module 308, data payload processing module 310, network infosec control adjusting module 312, and/or other instruction modules.

The modules 308, 310, 312 and other modules implement APIs containing functions/sub-routines which can be executed by another software system, such as email and internet access controls. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

Figure 5:
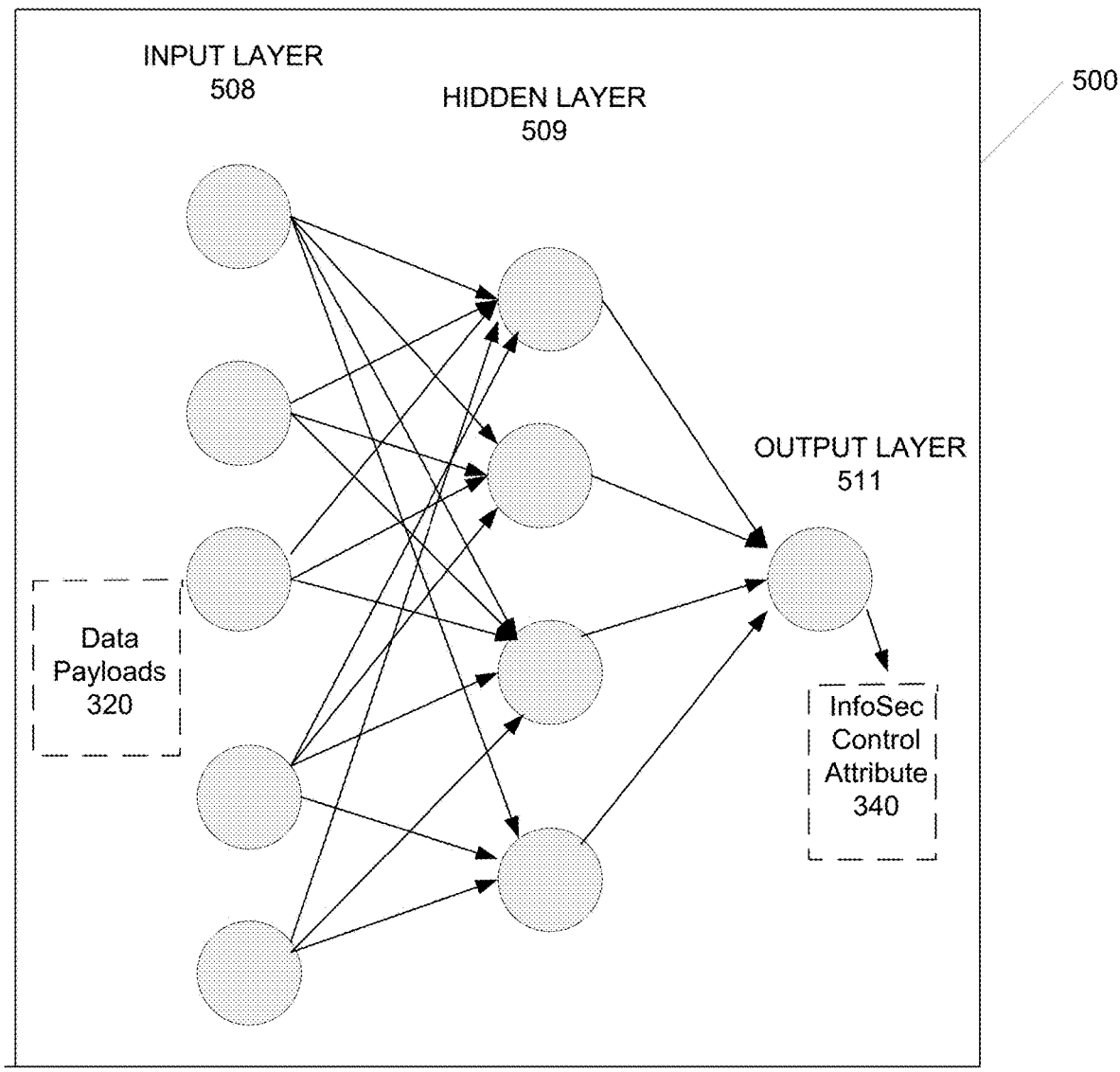
FIG. 5 is an illustrative functional block diagram of a neural network that may be used to implement the processes and functions, in accordance with one or more implementations.

Some aspects of various exemplary constructions are described by referring to and/or using neural network(s). Machine learning controller processing module 308 may be configured to electronically process with a machine deep learning controller. Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. Computer networks 203, 201 may incorporate various machine intelligence (MI) neutral network 500 (see FIG. 5) features of available Tensorflow (https://www.tensorflow.org) or Neuroph software development platforms (which are incorporated by reference herein). Referring to FIG. 5, neural network 500 is generally arranged in "layers" of node processing units serving as simulated neutrons, such that there is an input layer 508, representing the input fields into the network. To provide the automated machine learning processing, one or more hidden layers 509 with machine learning rule sets processes the input data. An output layer 511 provides the result of the processing of the network data.

Figure 6:
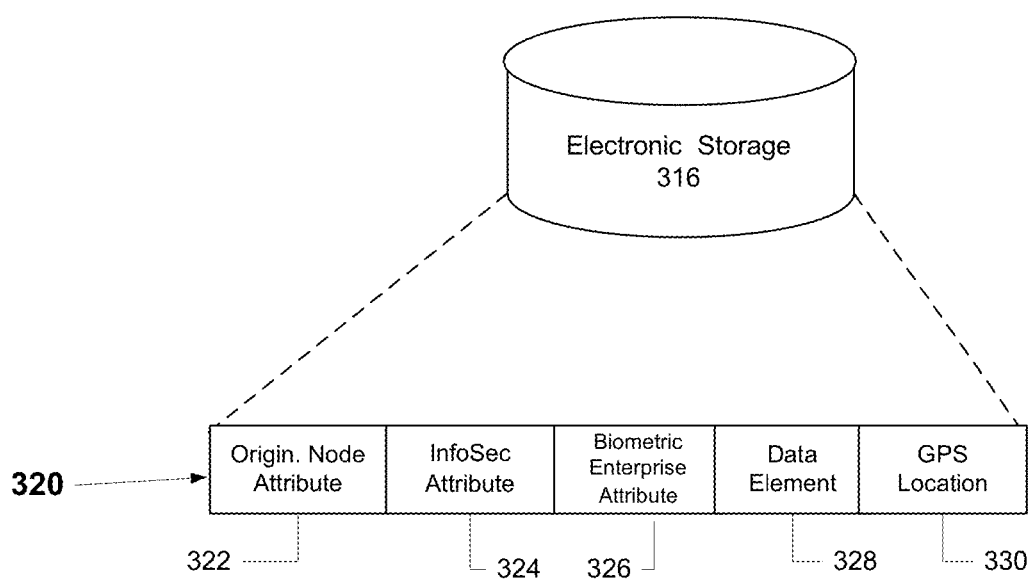
FIG. 6 is an example block diagram of an illustrative payload data set in accordance with one or more implementations.

With reference to FIGS. 3 and 6, machine learning controller processing module 308 receives the data payloads 320 that may include the originating node attribute 322, infosec data attribute 324 and the biometric enterprise attribute 326 and at least one data element 328 associated with the originating node attribute 322 to create an infosec control attribute. The data payload 320 includes the "attribute data" including ASCII characters in computer readable form or binary complied data, such as biometric data. The ASCII characters or binary data can be manipulated in the software of system 300. The originating node attribute may include the access groups the specific user may belong to which includes their exceptions, regular and elevated privileges, databases, and tools and applications.

An infosec data attribute 324 may include logs (prints, proxy, email, login, phone), badge access and other user generated activities. A biometric enterprise attribute 326 may include one or more of the following—binary data directly associated with a specific user, line of business data, physical location data, manager information data, date of hire data, employee status data (active/terminated), prior history data with network usage. A biometric device system (part of system 100) may be included to allow for scanning of an iris of the user, retina scan, face recognition, and/or other types of biometric identification and authentication, including fingerprint scan analysis specific to the user.

An infosec control attribute 340 may include level of restriction index rankings such as a first level, a second level, a third level, a fourth level and a fifth level based on user behavior analysis output from the Machine learning controller processing module 308. Nevertheless, restriction index rankings could be additional levels in other implementations, such as six, or seven levels.

With continued reference to FIG. 3, machine learning controller processing module 308 implements deep learning machine learning techniques implementing representation of learning methods that allows a machine to be given raw data and determine the representations needed for data classification. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, the deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Deep learning ascertains structure in data sets using backpropagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

In some implementations of machine learning controller processing module 308, deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

In one or more implementations, machine learning controller processing module 308 includes deep learning technology that may utilize a convolutional neural network (CNN) segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, rather than looking for an object, it is more efficient to look for edges which form motifs which form parts, which form the object being sought. These hierarchies of features can be found in many different forms of data such as speech and text, etc.

In some implementations of machine learning controller processing module 308, learned observable features include objects and quantifiable regularities learned by the machine during supervised learning. A machine provided with a large set of well classified data is better equipped to distinguish and extract the features pertinent to successful classification of new data. A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given Example training dataset.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved. Exemplary training data is provided below for machine learning controller processing module 308.

Example training dataset 1. A loss of intellectual property investigation is opened on Person 1. As the investigation is created in a case management system 300, a binary flag is sent to machine learning controller processing module 308 which in-turn implements enhanced controls to include Full Outbound Email review and print thresholds become more restrictive. At this stage Person 1 is unaware of the investigation. Machine learning controller processing module 308 performs an auto-pull of user and workforce data, and non-technical indicators to detect a precipitating event.

Investigators make decision to interview Person 1. Prior to interview request, additional controls and/or control thresholds become more restrictive. Example: access to internet denied to prevent uploads and access to network paused.

Example training dataset 2. Person 2 announces resignation/retirement from an organization. Manager submits notification to the HR data system and a binary flag is automatically sent to machine learning controller processing module 308. Machine learning controller processing module 308 triggers print and Full Outbound Email controls, and badge log anomaly detection. Example: Person Y is detected accessing a secure building after hours. Machine learning controller processing module 308 sends an alert to the manager and precautionary technical controls, such as internet deny and scan of laptop/desktop is performed. Machine learning controller processing module 308 also performs an auto-pull of user and workforce data, and non-technical indicators to detect a precipitating event.

Example training dataset 3. Person 3 is detected conducting proxy avoidance to access restricted (blocked) websites. The control sends a binary flag to machine learning controller processing module 308 which implements internet deny control and restricts upload file size control threshold.

Example training dataset 4. Person 4 fails to perform mandatory disclosure reviews of various confidential information. Machine learning controller processing module 308 receives the binary flag to implement Full Outbound Email and auto-pulls chat and email logs. Person 4 has a secondary Compliance alert and machine learning controller processing module 308 triggers an alert to pull phone logs and Person 4 customer interactions. Machine learning controller processing module 308 prompts full monitoring of user activity to detect potential customer/employee unauthorized collaboration.

Example training dataset 5. Person 5 violates physical security protocols sending a binary flag to machine learning controller processing module 308. Machine learning controller processing module 308 automatically pulls badge logs and scans data feeds to see if there is a potential inciting event. Physical security is alerted that Person 5 was denied advancement or movement prior to event. Machine learning controller processing module 308 also alerts internal system of cybersecurity risk of possible correlation between denial and security incident opening a venue.

Once a desired neural network behavior has been achieved (e.g., a machine learning module 308 has been trained to operate according to a specified threshold, etc.), the machine learning module 308 can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network can provide direct feedback to another process. In certain examples, the neural network outputs data that is buffered (e.g., via the cloud, etc.) and validated before it is provided to another process.

Machine learning controller processing module 308 may implement dynamic baselines of 18 months for user activity, 12 months for role based activity, and 6 months for enterprise activity. To alleviate recourse constraints, the dynamic baselines can be centered on volume and type of data, not the data itself. Machine learning controller processing module 308 may be configured to electronically process with the machine learning controller.

System 300 includes module 310 that can ingest data points from a plurality of nodes from across the enterprise systems of record and via output APIs and implement controls based from results of machine learning controller processing module 308. Data payload processing module 310 may be configured to electronically process the data payloads in the network with machine learning. In one example, the data payload may include a network anomaly attribute. In other example, the data payloads may include the originating node attribute 322, infosec data attribute 324 and the biometric enterprise attribute 326 and the at least one data element 328 associated with the originating node attribute 322.

Network infosec control adjusting module 312 may be configured to real-time adjusting of a plurality of network infosec controls associated with the originating node attribute 322 based on the infosec control attribute 340 (output from machine learning controller processing module 308). The infosec control attribute 340 relates to control levels and may include binary attribute data pertaining to data access at a first level, outbound electronic messaging review at a second level, a manager electronic messaging review at a third level of restriction, and temporary delay of outbound electronic messaging at a fourth level of restriction. A firth level of restriction may include denial of internet access to prevent uploads and access to network paused. Nevertheless, other levels of control or restrictions are contemplated within the scope of this disclosure. Network infosec control adjusting module 312 can add one or more infosec control attributes to extend control duration, and adjust threshold levels in the controls. Machine learning controller processing module 308 in conjunction with Network infosec control adjusting module 312 can provide the data to identify how long controls should stay on for each flag compilation of flags, or role based or exception based user accounts with flags.

Network infosec control adjusting module 312 may use a software system implementing an API containing functions/sub-routines which can be executed by another software system, such as email and internet controls.

In some implementations, the at least one data element associated with the originating node attribute may include an electronic messaging control element, such as an API for an electronic mail system. In some implementations, the at least one data element associated with the originating node attribute may include log data attribute, such as one or more network access logs stored in computer readable memory. In some implementations, the at least one data element associated with the originating node attribute may include a GPS location attribute 330 pertaining to a geo-location of the device accessing the network (global positioning system (GPS) data), and including the time of period of the day (e.g., increments of only two, four, or six hours, such morning, afternoon, evening) and other similar data. The GPS location associated with GPS location attribute 330 may have at least the longitude and latitude of the location to linked to a mapping application.

In some implementations, computing platform(s) 302, remote platform(s) 304, and/or external resources 314 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 314 may be operatively linked via some other communication media.

A given remote platform 304 may include one or more processors configured to execute computer program modules. The computer program modules may be configured to enable an expert or user associated with the given remote platform 304 to interface with system 300 and/or external resources 314, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 314 may include sources of information outside of system 300, external entities participating with system 300, and/or other resources. In some implementations, some or all of the functionality attributed herein to external resources 314 may be provided by resources included in system 300.

Computing platform(s) 302 may include electronic storage 316, one or more processors 318, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 316 may comprise non-transitory storage media that electronically stores information. The electronic storage media of electronic storage 316 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 316 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 316 may include one or more virtual storage resources (e.g., cloud storage, a virtual private network, and/or other virtual storage resources). Electronic storage 316 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, and/or 312, and/or other modules. Processor(s) 318 may be configured to execute modules 308, 310, and/or 312, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, and/or 312 are illustrated in FIG. 3 as being implemented within a single processing unit, in implementations in which processor(s) 318 includes multiple processing units, one or more of modules 308, 310, and/or 312 may be implemented remotely from the other modules. The description of the functionality provided by the different modules 308, 310, and/or 312 described below is for illustrative purposes, and is not intended to be limiting, as any of modules 308, 310, and/or 312 may provide more or less functionality than is described. For example, one or more of modules 308, 310, and/or 312 may be eliminated, and some or all of its functionality may be provided by other ones of modules 308, 310, and/or 312. As another example, processor(s) 318 may be configured to execute one or more additional modules that may perform some or all of the functionality attributed below to one of modules 308, 310, and/or 312.

Figure 4A:
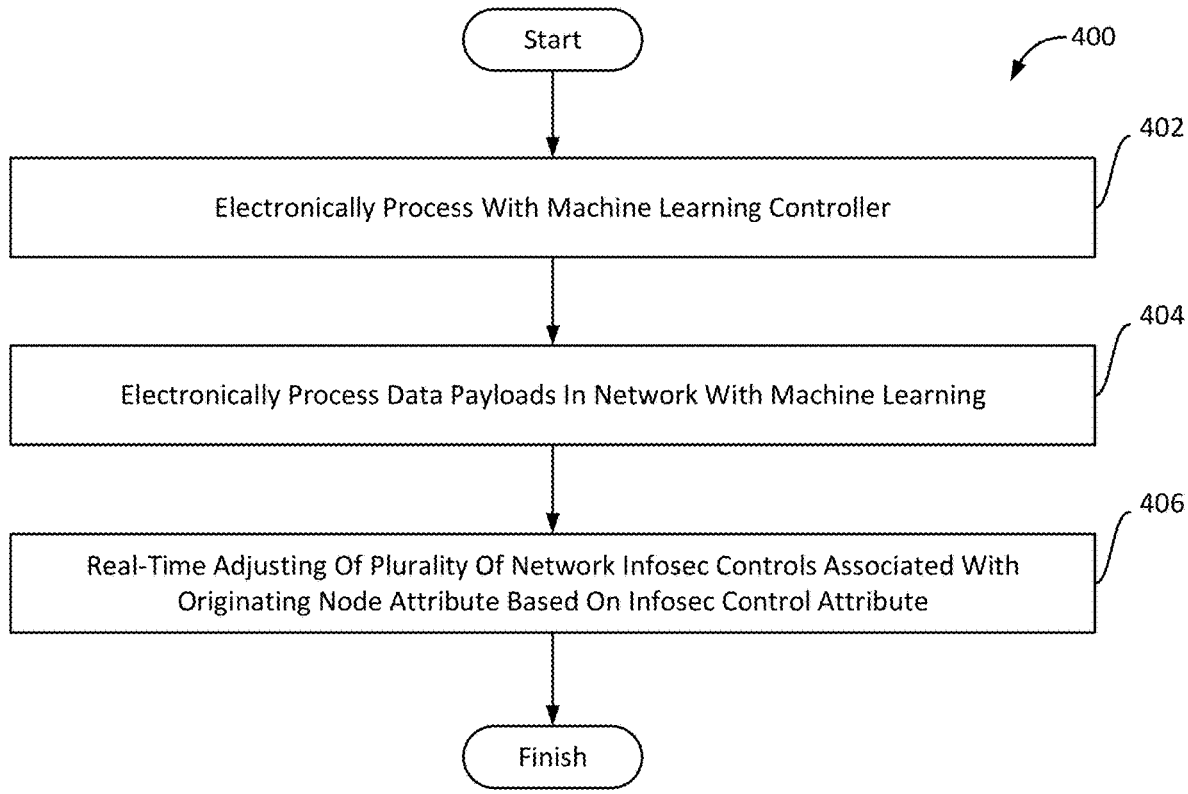
FIGS. 4A and 4B illustrate a method for data communication, in accordance with one or more implementations.

FIGS. 4A and/or 4B illustrates a method 400 for data communication, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A and/or 4B and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4A illustrates method 400, in accordance with one or more implementations. An operation 402 may include electronically processing with a machine learning controller. The data payloads may include the originating node attribute, infosec data attribute and the biometric enterprise attribute and the at least one data element associated with the originating node attribute to create an infosec control attribute. Operation 402 may be performed by one or more hardware processors configured by machine-readable instructions including a module that is the same as or similar to machine learning controller processing module 308, in accordance with one or more implementations.

An operation 404 may include electronically processing the data payloads in the network with machine learning. Operation 404 may be performed by one or more hardware processors configured by machine-readable instructions including a module that is the same as or similar to data payload processing module 310, in accordance with one or more implementations.

An operation 406 may include and real-time adjusting of a plurality of network infosec controls associated with the originating node attribute based on the infosec control attribute. Operation 406 may be performed by one or more hardware processors configured by machine-readable instructions including a module that is the same as or similar to network infosec control adjusting module 312, in accordance with one or more implementations.

Figure 4B:
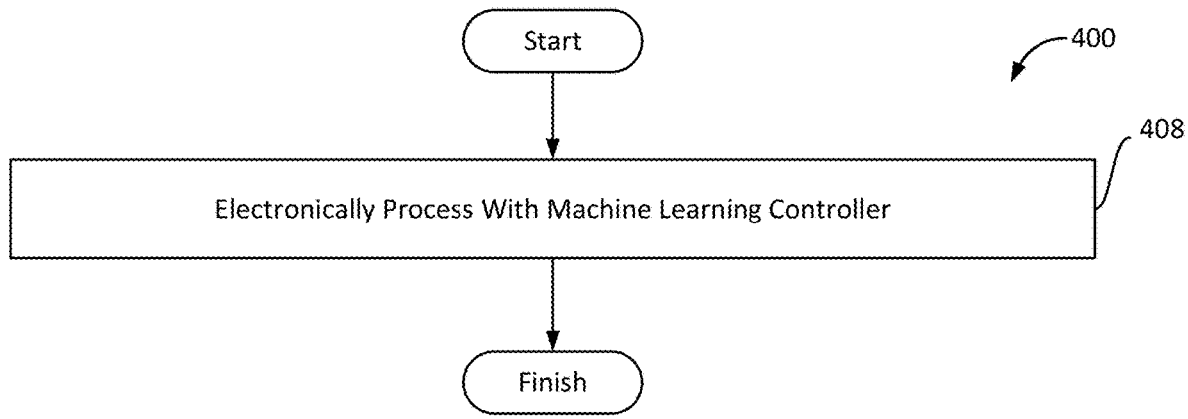

FIG. 4B illustrates method 400, in accordance with one or more implementations. An operation 408 may include further including electronically processing with the machine learning controller. The data payload may include a network anomaly attribute. Operation 408 may be performed by one or more hardware processors configured by machine-readable instructions including a module that is the same as or similar to machine learning controller processing module 308, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An electronic computer implemented method of data communication, comprising:
    electronically processing with a machine learning controller, including convolutional neural network segments data using convolutional filters without external identification, a plurality of virtual nodes with data payloads including the originating node attribute, infosec data attribute and the biometric enterprise attribute and the at least one data element associated with the originating node attribute to create an infosec control attribute;
    electronically processing the data payloads in the network with machine learning the convolutional filters, and real-time adjusting of a plurality of network infosec controls associated with the originating node attribute based on the infosec control attribute; wherein the machine learning controller uses enterprise network machine learning training datasets; wherein the infosec control attribute includes selective binary attribute data control levels for restricting data access for the biometric enterprise attribute at a first data control level, outbound electronic messaging review for the biometric enterprise attribute at a second data control level, a manager electronic messaging review for the biometric enterprise attribute at a third data control level and temporary delay of outbound electronic messaging for the biometric enterprise attribute at a fourth data control level, and a denial of internet access to prevent uploads and access to network associated with the biometric enterprise attribute at a fifth data control level.

2. The method of claim 1, further comprising electronically processing with the machine learning controller, the data payload including a network anomaly attribute.

3. The method of claim 1, wherein the at least one data element associated with the originating node attribute comprises an electronic messaging control element.

4. The method of claim 1, wherein the at least one data element associated with the originating node attribute comprises a log data attribute.

5. The method of claim 1, wherein the at least one data element associated with the originating node attribute comprises a GPS location attribute.

6. A system configured for data communication, the system comprising:
    one or more hardware processors configured by machine-readable instructions to:
        electronically process with a machine learning controller including convolutional neural network segments data using convolutional filters without external identification, a plurality of virtual notes with data payloads, the data payloads including the originating node attribute, infosec data attribute and the biometric enterprise attribute and the at least one data element associated with the originating node attribute to create an infosec control attribute;
        electronically process the data payloads in the network with machine learning the convolutional filters; and
        real-time adjusting of a plurality of network infosec controls associated with the originating node attribute based on the infosec control attribute; wherein the machine learning controller uses enterprise network machine learning training datasets; wherein the infosec control attribute includes selective binary attribute data control levels for restricting data access for the biometric enterprise attribute at a first data control level, outbound electronic messaging review for the biometric enterprise attribute at a second data control level, a manager electronic messaging review for the biometric enterprise attribute at a third data control level and temporary delay of outbound electronic messaging for the biometric enterprise attribute at a fourth data control level, and a denial of internet access to prevent uploads and access to network associated with the biometric enterprise attribute at a fifth data control level.

7. The system of claim 6, wherein the one or more hardware processors are further configured by machine-readable instructions to electronically process with the machine learning controller, the data payload including a network anomaly attribute.

8. The system of claim 6, wherein the at least one data element associated with the originating node attribute comprises an electronic messaging control element.

9. The system of claim 6, wherein the at least one data element associated with the originating node attribute comprises a log data attribute.

10. The system of claim 6, wherein the at least one data element associated with the originating node attribute comprises a GPS location attribute.

11. A computing platform configured for data communication, the computing platform comprising:
a non-transient computer-readable storage medium having executable instructions embodied thereon; and
one or more hardware processors configured to execute the instructions to:
electronically process with a machine learning controller including convolutional neural network segments data using convolutional filters without external identification, a plurality of virtual notes with data payloads, the data payloads including the originating node attribute, infosec data attribute and the biometric enterprise attribute and the at least one data element associated with the originating node attribute to create an infosec control attribute;
electronically process the data payloads in the network with machine learning the convolutional filters; and
real-time adjusting of a plurality of network infosec controls associated with the originating node attribute based on the infosec control attribute; wherein the machine learning controller uses enterprise network machine learning training datasets; wherein the infosec control attribute includes selective binary attribute data control levels for restricting data access for the biometric enterprise attribute at a first data control level, outbound electronic messaging review for the biometric enterprise attribute at a second data control level, a manager electronic messaging review for the biometric enterprise attribute at a third data control level and temporary delay of outbound electronic messaging for the biometric enterprise attribute at a fourth data control level, and a denial of internet access to prevent uploads and access to network associated with the biometric enterprise attribute at a fifth data control level.

12. The computing platform of claim 11, wherein the one or more hardware processors are further configured by the instructions to electronically process with the machine learning controller, the data payload including a network anomaly attribute.

13. The computing platform of claim 11, wherein the at least one data element associated with the originating node attribute comprises an electronic messaging control element.

14. The computing platform of claim 11, wherein the at least one data element associated with the originating node attribute comprises a log data attribute.

15. The computing platform of claim 11, wherein the at least one data element associated with the originating node attribute comprises a GPS location attribute.

16. The computing platform of claim 11, wherein the machine learning controller comprises a deep learning processor.

* * * * *